Nov. 10, 1936.                W. G. SMITH                2,060,537
                            INDICATING DEVICE
                          Filed June 4, 1936              5 Sheets-Sheet 1

INVENTOR.
W. Graydon Smith,
BY
ATTORNEY.

Nov. 10, 1936.  W. G. SMITH  2,060,537
INDICATING DEVICE
Filed June 4, 1936  5 Sheets-Sheet 2

INVENTOR.
W. Graydon Smith,
BY
ATTORNEY

Nov. 10, 1936.　　　W. G. SMITH　　　2,060,537
INDICATING DEVICE
Filed June 4, 1936　　　5 Sheets-Sheet 4

Nov. 10, 1936.  W. G. SMITH  2,060,537
INDICATING DEVICE
Filed June 4, 1936  5 Sheets—Sheet 5

INVENTOR.
W. Graydon Smith,
BY
ATTORNEY.

Patented Nov. 10, 1936

2,060,537

UNITED STATES PATENT OFFICE 2,060,537

INDICATING DEVICE

William Graydon Smith, Newton Highlands, Mass., assignor to National Company, Inc., Malden, Mass., a corporation of Massachusetts Application June 4, 1936, Serial No. 83,579

18 Claims. (Cl. 116—124.3)

This invention relates to indicating devices generally. More particularly this invention relates to a dial and/or similar mechanism adapted to be used as a micrometer caliper, radio tuning control and the like, where a relatively accurate reading is desired.

An object of this invention is to provide a simple indicating mechanism employing a pair of calibrated disc-like members angularly movable with respect to each other at substantially the same peripheral velocity, and being arranged so that one of the disc-like members is positioned behind the other so that the graduations of the rear member may be viewed through small windows provided in the front member as said members are rotated.

Another object of this invention is to provide a simple mechanism employing a pair of disc-like graduated or numbered members which are adapted to be movable angularly at least to a slight extent with respect to each other to indicate accurately the number of revolutions through which a shaft, on which said disc-like members are mounted, is rotated.

Another object of this invention is to provide a dialing device adapted to be mounted on or associated with a shaft to be rotated for rotating said shaft through relatively small angles and for indicating the rotation of said shaft by means of sets of pre-arranged numbers and indicators carried by indicator elements movable with respect to each other to a predetermined extent as said shaft is rotated.

A further object of this invention is to provide an adjusting and indicating mechanism adapted to rotate a shaft and indicate accurately the extent to which said shaft was rotated in the clockwise or counter clockwise direction.

Other and further objects of this invention will be apparent to those skilled in the art to which it relates from the following specification and claims.

In accordance with this invention I provide an indicating device of simple and efficient construction adapted to be used simply as a measuring device, or as a computing device for combining readings on one dial and pointer device heretofore obtained from two or more dial and pointer devices, or as an accurate dial control device adapted to indicate the extent of rotation of a shaft. I have illustrated and described several embodiments of the indicator arrangement of my invention, all of which will be more clearly understood from the following specification.

The indicator device set forth herein includes two rotatable or movable members which cooperate top roduce the correct indication of the shaft being rotated. The shaft being rotated is either attached to one of the movable members or geared thereto and rotation of the shaft transmits motion either through the latter member or through suitable gear or gears to the other of said rotatable or movable members. These two members are provided with graduations and/or scales which are shifted in a predetermined manner with respect to each other, through the operation of the rotated shaft or through the operation of one of the members, adapted to rotate said shaft, and the extent through which the shaft is rotated or the revolutions imparted thereto, are indicated or may be easily determined from said graduations and/or scales. One of the rotatable members is positioned in front of the other and is provided with a series of small windows through which successive parts of the scales or graduations of the rear rotatable member are brought into view.

The preferred embodiment of my invention employs two disc-like members, each provided with gear teeth. The gear teeth of one of these disc-like members are adapted to mesh with the teeth of the other member. Rotation of one member, therefore, causes the other to rotate also. However, these members, being eccentrically mounted with respect to each other and having an unlike number of teeth, do not rotate at the same angular velocity although the peripheral velocities of the aforesaid small windows of the front rotatable member and the scales or graduations of the rear rotatable members are the same. The graduations or scales carried by the rear disc-like member are, however, caused to shift in position with respect to the aforesaid windows and indicate the rotation or revolution of the shaft.

One of the embodiments of this invention shows one of the disc-like members provided with a knob and fastened to a shaft for the purpose of rotating this shaft and a reduction gear arrangement. This embodiment of the invention is particularly adapted to be employed for controlling the tuning of signaling apparatus. It is, however, to be understood that this invention is not limited to use with tuning controls and that this illustration of the use thereof is only by way of example.

Further details of this invention will be set forth in the specification and the drawings in which, briefly, Figures 7 and 8 are views illustrating the inner surfaces of the dial shown in Figures 3 and 4.

Figure 1:
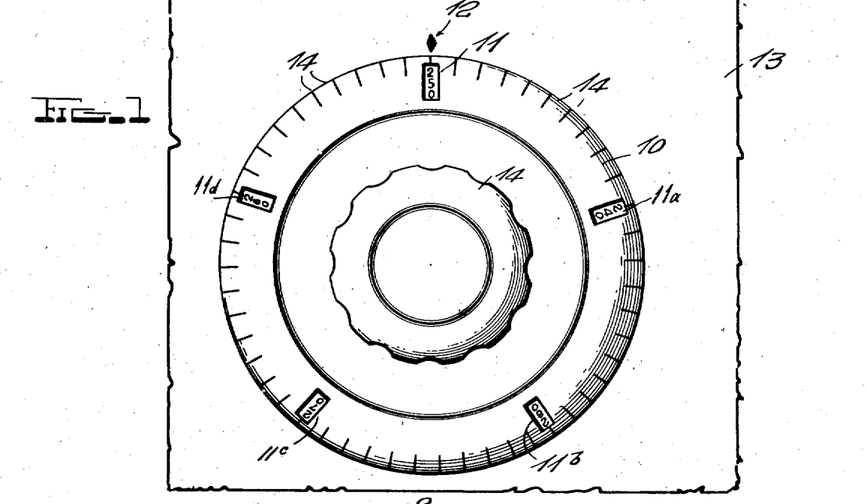
Figure 1 shows a front view of the indicating and control mechanism.

Referring to the drawings in detail, particularly Figure 1, reference numeral 10 designates the front graduated mask or dial having five small holes 11, 11a, 11b, 11c, and 11d formed adjacent to the periphery thereof. The periphery of this dial 10 is graduated, and graduations 14, evenly spaced, are engraved, embossed, printed, etched, or otherwise placed upon the beveled surface adjacent to the circumference of the dial. The windows 11, 11a, 11b, 11c, and 11d are equally spaced around the dial, ten graduations apart. A pointer 12 is attached to the panel 13 near the top of the dial 10 and forms a pointer or indicator. A knob 14 is screwed, bolted, or otherwise attached to this dial to facilitate rotation thereof.

Figure 2:
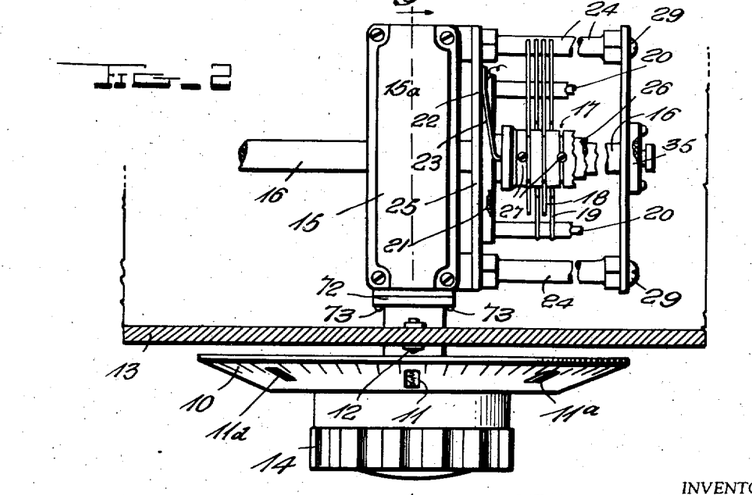
Figure 2 shows a top view of the indicating and tuning control.

This dial mechanism is placed on the front of the panel 13 and is held there by a shaft and bearing arrangement, described in following paragraphs of this specification. Behind the panel 13 a gear box 15 is positioned. This gear box supports a shaft upon which the devices to be controlled are mounted. For purposes of illustration a tuning condenser 22 is shown mounted on one side of the gear box 15. Several of these units or similar units may be mounted on the shaft 16 to be controlled in accordance with the operation of the dial knob 14, if desired. The condenser in the present case is provided with rotor and stator plates 18 and 19, respectively. The stator plates are held in spaced relation upon the grooved or notched supports 20 the ends of which are attached to insulation supports 21 and 21a. An insulation plate or panel 25, to which the support 21 is attached, is bolted to the side of the gear housing 15 by means of the members 24, the threaded ends of which extend into threaded holes formed in the side of the gear housing, through suitable holes formed in the insulation member 25. The rotor plates 18 are held in a hollow-grooved-cylindrical support 17, properly spaced. One end of this supporting member 17 is engaged by a wiping resilient contact member 23 for the purpose of forming electrical contact with the rotor plates through this support. A suitable sleeve 26 is positioned over the shaft 16 and supports the member 17 on the shaft electrically insulated therefrom. The sleeve may be of any suitable insulation material, such as, fiber, bakelite, hard rubber, and the like, which is somewhat deformable. The set screws 27 are provided to threaded holes in the support 17 for the purpose of fastening this tubular support over the insulation sleeve 26 and the shaft 16. A substantially rigid end plate 28 is attached to the ends of the members 24 by suitable bolts 29. An insulation bearing member 35 is supported in the end plate 28 in engagement with the end of the shaft 16. This insulation bearing carries a ball bearing inside thereof and is provided with a screw adjustment for thrusting said ball bearing against the end of said shaft. A piece of insulation material similar to the insulator 21, made of material such as synthetic porcelain, porcelain, glass, boro-silicate glass, fused quartz, or the like, having good insulating properties for relatively high frequency electric currents, is attached to the ends of the stator supports 20 and to the end plate 28 to provide additional supporting means for the said stator plates. One or more variable electrical condenser units such as, the condenser 22, may be mounted on each side of the gear box 15, in a tandem arrangement, if desired. However, if only one unit is to be used, then the shaft 16, shown extending to the left of the gear housing 15 is cut off adjacent to said housing.

Figure 5:
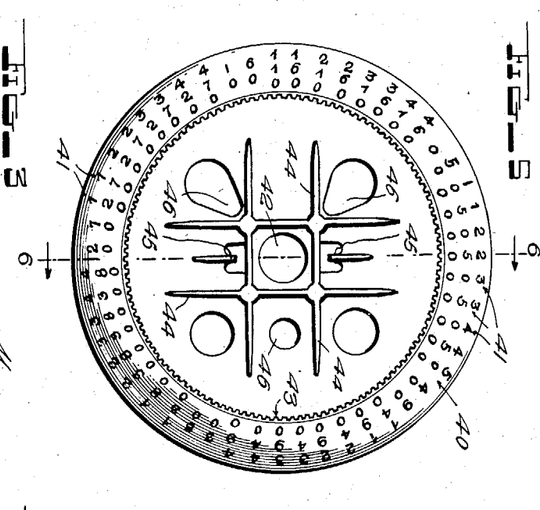
Figures 5 and 6 show the inner indicating dial in front elevation and cross-section, respectively.
Figure 6:
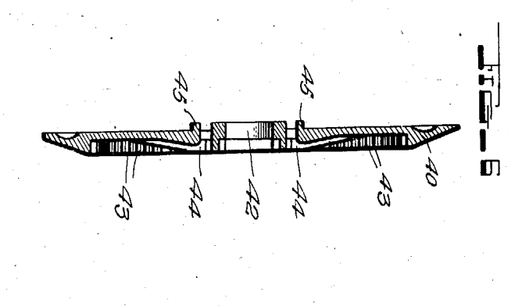
Figures 9, 10, 15, 16:
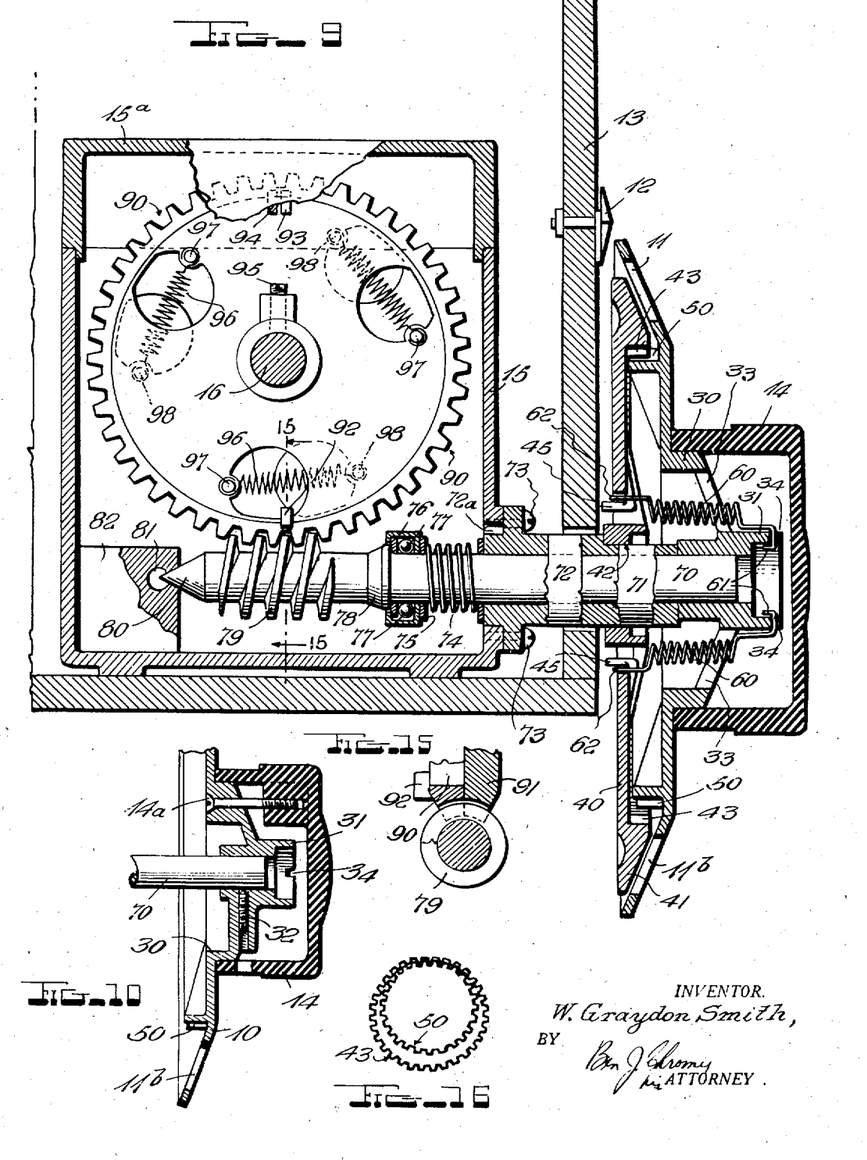
Figure 9 is a sectional view taken along the line 9—9 of Figure 2.
Figure 10 is a sectional view of the knob employed on the control, showing this knob attached to the front dial.
Figure 15 is a section through the worm gears along the line 15—15 of Fig. 9.
Figure 16 is a diagram illustrating the principle of operation.

The dial 10 and the dial 40, which is positioned inside of the dial 10, are illustrated in detail in Figures 3, 4, 5, and 6. These dials are assembled and held together by two small springs 60, shown in Figure 9. The dial 10 is provided with a centrally-located shaft-receiving section 31, the forward end of which is provided with two small notches 34 which receive the hooks 61 of the springs 60. These springs are passed through the holes 33 formed in the section 35 and the hooks 62, formed at the other ends of the springs, brought into engagement with the small projections 45 formed in the disc 40, as shown in Figures 5, 6, and 9. When the disc-like dials 10 and 40 are assembled, the notches 34 and the projections 45 must be in alignment and the number 250 must appear visible through the window or hole 11, as will be described in more detail further in the specification.

The central portion of the disc 40 is provided with 3 holes 46. Portions of these holes are in alignment with the holes 47 provided to the disc-like dial 10. These holes are made to provide access to and receive small bolts which are used to attach the knob 14 to the front dial 10 as illustrated in more detail in Figure 10. A set screw 32 is provided to the dial 10 for the purpose of attaching this dial to the shaft 70, shown in Figures 9, 11, and 12.

Figure 7:
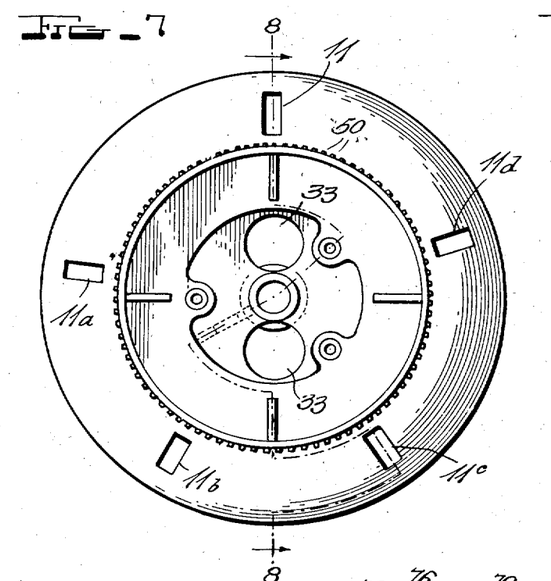
Figure 8:
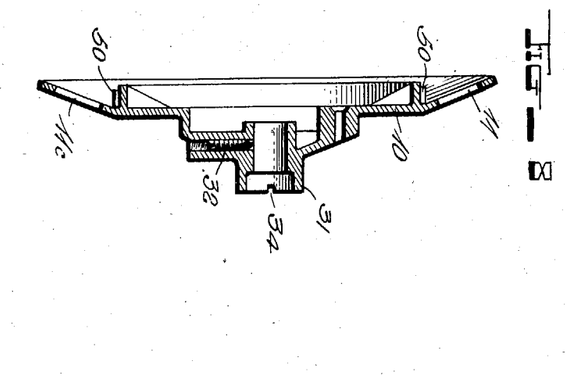
Figure 8 is a sectional view taken along the line 7—7 of Figure 7.

A ring-like gear 50 is provided to the inside of the dial 10 as shown in Figures 7 and 8. This gear is made to mesh with the gear 43 of the dial 40, when the two dials are assembled as in Figure 9.

After the two dials are assembled and held together by the spring 60 as aforesaid, the dial assembly is placed over the end of the shaft 70 and the hole 42 of the dial is placed over the eccentrically disposed section 71 of the bearing member 72. This bearing member is attached to the gear casing 15 by small bolts 73 and projects outward from the front side of this gear casing. A spring 74 abuts against the inner surface of the bearing 72 and also against the bearing washer 75 which is positioned adjacent to the ball bearing housing 76. The housing 76 encloses and forms a race for ball bearings 77 and abuts against the shoulder 78 formed on the shaft 70. The worm 79 is formed integral with the shaft and made to mesh with the worm wheels 90 and 91, as shown in Figs. 9 and 15. The end 80 of the shaft 70 is pointed and extends into the hole 81 of a thrust bearing, formed in the projection 82 on the inside of the housing 15. This hole forms a bearing surface for the shaft 70, serving to keep the worm gears in mesh, and the inner portion thereof may be made larger than the shaft point to permit grease to be packed therein.

When the worm gear 79 is placed in the housing 15 in mesh with the worm wheel 90, the bearing member 72 must be pressed into engagement with the side of the housing 15 in such a way that the lug or projection 72a fits into a slot 72b formed in the wall of said housing. When this lug 72a is received in the slot 72b the section 71 which is eccentrically disposed with respect to the shaft 70 assumed its proper position with respect to said shaft. This is the same position as the shaft hole of the dial 10 and the hole 42 of the dial 40 have with repect to each other when the scale number 250 is visible through the hole 11, as shown in Fig. 1. The number 250 is one of the scale numbers on the scale 41 of dial 40, Fig. 5.

Figure 12:
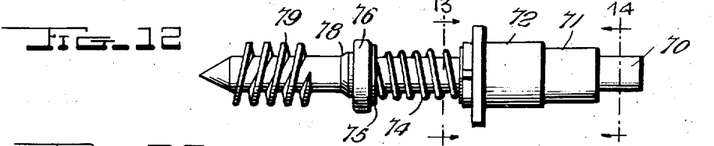
Figure 13:
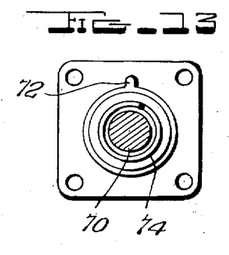
Figures 13 and 14 are sectional views along the lines 13—13 and 14—14 of Figure 12, respectively.
Figure 14:
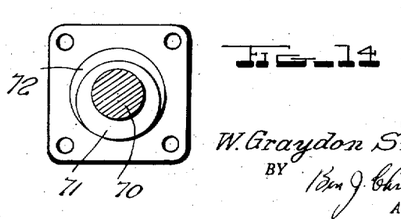

The relation of the shaft 70 and the section 71, which is eccentrically disposed with respect to this shaft, is shown in more detail in Figure 14, which is a cross-section taken along the line 14—14 of Figure 12. The dial 10 is attached to the shaft 70 adjacent to the section 71, by means of the set screw 32 and is adapted to rotate this shaft when the knob 14, attached to the dial, is rotated. The dial 40, which is positioned substantially inside of the dial 10, fits over the section 71, rather snugly, and when the dial 10 and shaft 70 are rotated, this eccentrically disposed section 71 causes the dial 40 to oscillate with respect to the dial 10. This causes an angular displacement or a slight rotation to take place between the dials 10 and 40 through the operation of the gears 50 and 43.

The worm wheels 90 and 91 associated with the worm 79 are mounted inside of the housing 15 on the shaft 16 which extends through the housing and is mounted in bearings formed in the sides of the latter. The worm wheel 90 is provided with two lugs 92 and 93 which cooperate with a similar lug 94 formed in the inside of the top 15a, to limit the rotation of this worm wheel 90 substantially to one-half revolution thereof. The purpose of this will be more fully explained in the operation of this device. Several springs 96 attached to small lugs 97 provided to the worm wheel 90 are also attached to similar lugs 98 formed on the worm wheel 91. The purpose of these springs is to shift the worm wheels 90 and 91 with respect to each other slightly as these worm wheels are worn through engagement with the worm 79. Thus these springs serve to take up backlash that may otherwise be developed through the wearing of the worm gears after a certain period of normal use. These springs are adjusted to exert a slightly shearing action upon the teeth of the worm 79, that is, the teeth of the worm wheels 90 and 91 tend to shear the teeth of the worm 79 to a slight extent. This shearing action must not be made too great, otherwise undue wear will be placed upon the teeth of the worm gears.

The gear housing 15 is provided with a cover 15a, attached in any convenient manner, as by suitable bolts, to the body of the housing. When it is desired to gain access to the gears 90 and 91, this cover 15a may be removed. The gear 90 is fastened to the shaft 16 by means of one or more set screws 95. The gear 91 is not attached to the shaft 16 by set screws or otherwise except through the springs 96 and the gear 90. The shaft 16 may be removed from the housing 15 by loosening the set screw 95 and by loosening the set screws 26 of the condenser 22 shown in Figure 2. The housing 15 is preferably packed with grease to a slight extent so that the worm gears and the bearings of the shaft 70 are properly lubricated to reduce wear to a minimum.

Figures 3, 4:
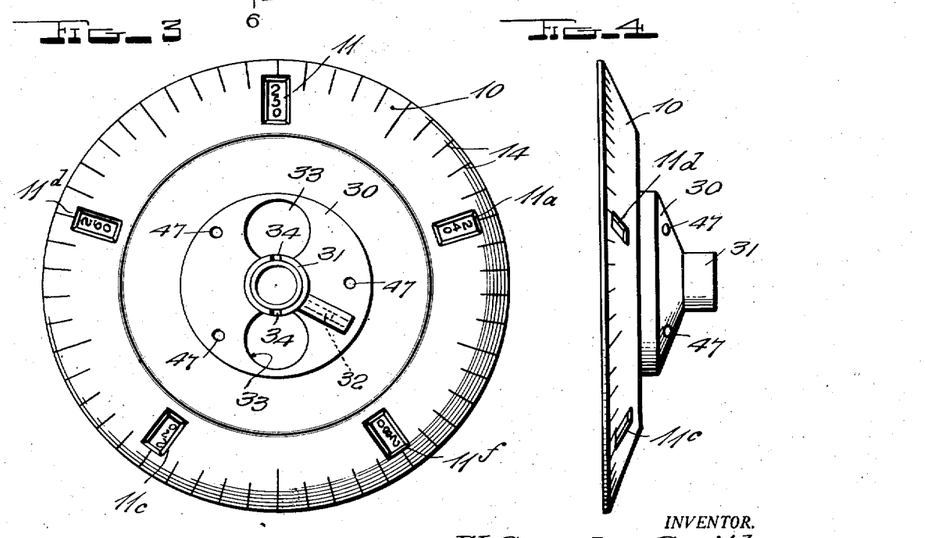
Figures 3 and 4 are views showing one of the indicator dials in front and side elevation.

The beveled section 41 of the dial 40, shown in Figures 5 and 6, is provided with a series of numbers, adapted to be viewed through the small holes 11, 11a, 11b, 11c, and 11d, as the dials are rotated. One group of these numbers begins with 0 and increases in steps of 50 up to and including 500. The next group to the left of this first group begins with 10 and increases in steps of 50 to 460. Likewise, the next group to the left begins at the bottom of the dial, as shown in Figure 5, with the number 20 and increases in steps of 50 to 470. Continuing around the dial 40 in the counter clockwise or left direction, the next group of numbers begins with 30 and increases in steps of 50 up to and including 480. The remaining group of numbers begins with 40 and increases in steps of 50 up to and including 490. When the dial 10 is placed over the dial 40 in such a way that the number 250 appears visible in the hole 11, the number 240 will appear visible in the hole 11a and the number 230 will appear visible in the hole 11b. Parts of the numbers 220 and 270 will be visible in the hole 11c, and the number 260 will appear in hole 11d. When these dials 10 and 40 are assembled with the springs 60 inserted in place and the assembled dial placed over the shaft 70 and the eccentrically disposed section 71 with the set screw 32 of the dial 10 fastened to the shaft 70, the dial 10 may be rotated, by manipulating the knob 14, either clockwise or counter clockwise. If this dial is rotated clockwise and the hole 11d brought into the position occupied by hole 11, as shown in Figure 3, then the number 260 will appear at the top of the dial adjacent to the pointer 12. If the rotation of the dial is continued in the clockwise direction and the hole 11c brought to the top position, the number 270 will become visible. This operation may be continued until the highest number, that is, 500, is brought into view at the top of the dial. At this time the rotation is stopped through the operation of the lug 92 on the worm wheel 90 and the lug 94 positioned in the top of the gear housing. The mechanism of this device is adjusted so that when the number 500 is visible at the top of the dial, these lugs 92 and 94 engage each other and stop further movement of the dial in the clockwise direction. At this point the condenser 22 is also adjusted to be at one extremity of its movement, that is, either the maximum or minimum capacity. These adjustments, of course, can be altered by setting the worm wheel at different positions and also by setting the condenser rotor plate in different positions, depending upon how it is desired to control the variable condenser or other variable units, such as, a variometer, a variable coupled transformer, a variable resistance, such as, a volume control, tone control, and the like which may be mounted on the shaft 16. The worm gears shown may be eliminated if desired and other forms of coupling employed. However, the stop lugs 92, 93, and 94, or some equivalent motion limiting arrangement must be used in this embodiment of the invention to prevent destruction of the springs 60.

When the number 500 is visible at the top of the dial, the dial may be rotated in the counter clockwise direction and the readings thereof decreased until the number 0 becomes visible at the top of the dial.

The operation of this invention is as follows. When the dial 10 is rotated by the knob 14, and the gear teeth 50 of this dial are in mesh with the teeth 43 of the dial 40, as shown in Figure 16, rotation of the dial 10 will cause rotation of the dial 40. Inasmuch as the number of teeth in the gear 43 is greater than the number in the gear 50, the dial 40 will rotate more slowly than the dial 10. Therefore if the number 250 is visible in the hole 11, as shown in Figure 3, when this hole is at the top of the dial, rotation of the dial in the clockwise direction until the hole 11 assumes the position of the hole 11a, in Figure 3, will cause the number 250 to shift a fraction of an inch to the left of this hole. However, this number will still be visible although it will not be centered with respect to said hole. If the dial is turned in the clockwise direction until the hole 11 is at the bottom of the dial, the number 250 will be shifted out of view and the number 300 will begin to appear in this hole. When the hole 11 is again brought to the top of the dial, this number 300 will be visible therein, properly centered. At this time the number 290 will be visible in the hole 11a and the number 310 will be visible in the hole 11b. If the dial is revolved another complete revolution in the clockwise direction, the number 350 will become visible in the hole 11. In the dial arrangement illustrated in Figs. 1 to 16, inclusive, ten complete revolutions are required to cover the scale thereof. For example, if the number 0 were visible in the opening 11, ten revolutions of the dial would be required to bring the number 500 to the top of the dial, turning the dial in the clockwise direction, as permitted by the stops 93 and 94 associated with the worm wheel 90 in the gear housing top 15a.

The dial 10 is graduated into fifty equal spaces around the circumference thereof and the holes 11, 11a, 11b, 11c, 11d, positioned equidistant, are separated by ten graduations. Thus when the dial is set with the number 0 in the hole 11, for example, the number 10 will appear in the hole 11d which is just ten graduations from the hole 11. As the hole 11c is brought to the top of the dial, the number 20 will appear therein, indicating that the dial has been turned twenty graduations, hole 11c being twenty divisions from the hole 11. Likewise, when the hole 11b is turned to the top of the dial, the number 30 appears therein, this hole being thirty divisions from the hole 11. After one complete revolution of the dial the number 50 appears in the hole 11 at the top of the dial. The scale 41 of dial 40 includes fifty-one numbers or graduations spaced an equal distance apart.

One of the features of this invention is that the numbers which appear within the operator's normal vision at the top of the dial, adjacent to the pointer 12 apparently remain stationary in the windows as the dial is rotated. This is accomplished by the eccentric mounting of the gears which permits the scales and the windows of the dials to have substantially the same peripheral velocity even though their angular velocities differ.

It is, of course, obvious that different calibrations of these dials may be employed in accordance with this invention. For example, a greater or lesser number of holes may be employed in the dial 10 and different graduations and scales may be employed on the dial 40. I have shown two variations of this dial employing different calibrations and different scale arrangements, in Figures 17, 18, 19, and 20. Corresponding parts of these figures are designated by the same reference numerals as employed in the previous figures. In these embodiments of this invention the dials 10 and 40 are mounted behind the panel 13 and are driven from the shaft 70. No knob for rotating the dials is shown on the front of the panel although it is obvious from the showing in the previous figures that this may be provided, if desired. At the same time the dials may be driven from the shaft of the electrical instrument with which they are associated and the electrical instrument may be controlled by other than manual controls.

The dial 10 is attached to the end of the shaft 70 by means of a suitable bolt 10c fitted into said shaft. A small gear adapted to mesh with the peripheral gear teeth of the dials 10 and 40 is mounted upon the pin 16f which is carried by the arm 16g. This arm is attached to the panel by means of a suitable bolt 13c and extends to the shaft 70.

Figure 11:
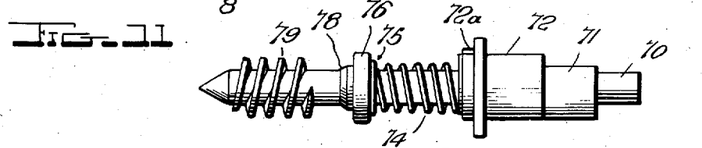
Figures 11 and 12 are views illustrating the worm gear and shaft.

The section 16k of the arm 16g corresponds to the member 72 shown in Figures 11 and 12. This section 16k is provided with a section 40b which is eccentrically disposed with respect to the shaft 70 in substantially the same manner as the section 71 is eccentrically disposed with respect to the shaft 70 of Figures 11 and 12. The dial 40 is supported on the section 40b which forms its bearing.

An elongated window 13a is formed in the panel 13 permitting the scale of the dial 40 and the holes 11, 11a, 11', 11a', 11e', 11f', and 11g' of the dial 10 to be viewed as these dials are rotated through the operation of the shaft 70 and the pinion gear 16j.

In this form of the invention the dial 10 is smaller than the dial 40 and rotates faster than the dial 40 inasmuch as these dials are rotated by gear teeth formed in their peripheries. The dial 40 is also provided with a scale 41 comprising a series of numbers, including the numbers 1 to 25. The numbers 1 and 2 are spaced ten divisions apart, as are all of the succeeding consecutive numbers up to and including the number 25. The dial 10, in this case, is provided with eight holes such as the hole 11'. These holes permit the numbers from the scale of the dial 40 to be brought into view in their consecutive order; for example, if the number 1 is visible in the hole 11, the next number that will be visible in the succeeding hole, as the dials are rotated, will be number 2 and so on, until the number 25 is rendered visible at the top of the dials through the elongated hole 13a.

The principle of operation of this embodiment is the same as that of the embodiment previously described.

Figures 17, 19:
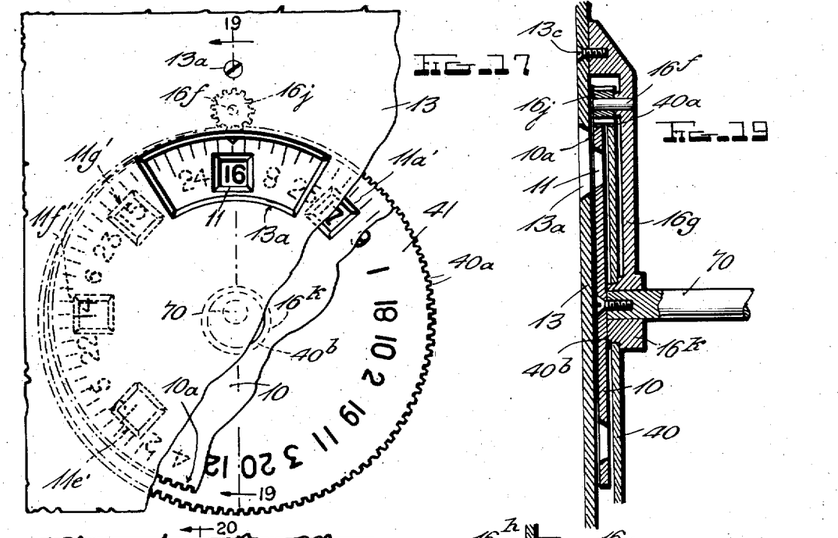
Figures 17 and 18 illustrate modified forms of the dial indicating mechanism of this invention.
Figures 19 and 20 are sectional views along the lines 19—19 and 20—20 of Figures 17 and 18 respectively.
Figures 18, 20:
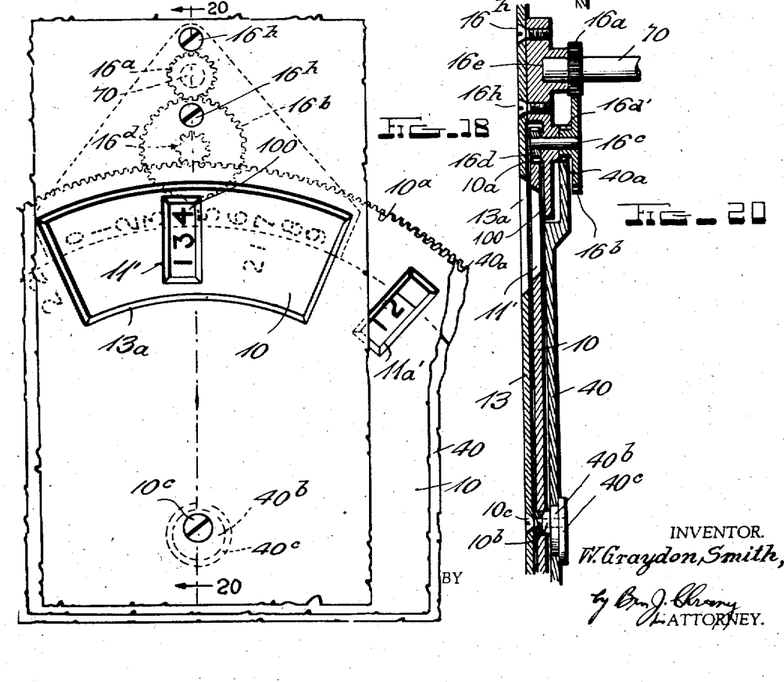

The embodiment of this invention shown in Figures 18 and 20 differs from that shown in Figures 17 and 19 in that the shaft 70 is provided with a small pinion gear 16a engaging the gear 16b which is mounted upon the pin 16c and drives the small pinions 16d and 16d'. These small pinions 16d and 16d' engage the peripheral gears 10a and 40a of the dials 10 and 40 respectively. These dials 10 and 40 are also eccentrically mounted with respect to each other, the member 40c being provided for this purpose. This member 40c is attached to the panel 13 by means of the small bolt 10c and is provided with two bearing surfaces 10b and 40b which engage the dials 10 and 40 respectively. The bearing surface 40b is eccentrically disposed with respect to the bearing surface 10b. An auxiliary scale 100, partially visible through the hole 13a in the panel 13 and the hole 11' of the dial 10, is employed in this embodiment in place of the graduations 14 on dial 10, Figure 3.

The operation of the embodiment of this invention shown in Figures 18 and 20 is similar to that of the other embodiments of this invention. In this case, however, the hole 11' passes over the graduations or scale 100 as the dial 10 is rotated. For example, when this dial 10 is rotated in the clockwise direction and the number 13 on the dial 40 is visible through the hole 11', the reading shown through this hole 11', as this hole is brought into view in the window 13a, will be 130 near left end of said window and increase in steps of one to 131, 132, 133, 134, and so on up to 139, as the hole 11' passes out of view under the panel 13 at the right end of said window. The next hole to the left of the hole 11' will then come in view and exhibit the number 140 at the left end of the window 13a. As the dial is rotated further in the clockwise direction, the reading increases to 149 and the next hole is brought into view at the left end of the window 13a giving the reading 150 and so on.

It is obvious that the embodiments of this invention shown in Figures 17, 18, 19, and 20 may be employed in conjunction with the embodiment of this invention shown in Figures 2 and 9, with other than manual controls shown therein. Different forms of drive mechanisms may be employed for driving or imparting angular motion to the dial or indicator devices.

While I have described my invention in detail with respect to the embodiments set forth herein, it is, of course, understood that modifications thereof may be made without departing from the spirit and scope of this invention. I therefore do not desire to limit this invention to the exact details described and shown except insofar as those details may be defined by the following claims.

What I claim and desire to secure by Letters Patent of the United States is as follows:

1. An indicating device comprising in combination rotatable scale means, a rotatable mask having means for revealing selected parts of the scale of said scale means during rotation thereof, and means for rotating the scale of said scale means and the scale revealing means of said mask at essentially the same linear velocity but at different angular velocities.

2. An indicating device comprising, a pair of disc-like dials comprising a first dial and a second dial, said first dial being positioned in front of said second dial, and being shaped to mask said second dial scales for said second dial, said first dial having means for viewing the scales of said second dial, a rotatable shaft, means for rotating at least one of said dials as said shaft is rotated, bearing members for said dials, one of said bearing members being disposed eccentrically with respect to the other, and means for rotating said second dial as said first dial is rotated at a different angular velocity for exhibiting different parts of the scales of said second dial for indicating rotation of said shaft.

3. An indicating device comprising, a pair of disc-like dials comprising a first dial and a second dial, said first dial being positioned in front of said second dial, scales for said second dial, said first dial having a plurality of substantially equally spaced holes around the periphery thereof for viewing the scales of said second dial, a rotatable shaft, means for fastening said first dial to said shaft, a bearing member for said second dial disposed eccentrically with respect to said shaft, means for rotating said first dial and said shaft, and means for rotating said second dial as said first dial is rotated at a different angular velocity for exhibiting different parts of the scales of said second dial for indicating rotations of said shaft.

4. An indicating device comprising, a pair of disc-like dials comprising a first dial and a second dial, said first dial being positioned in front of said second dial, scales for said second dial, said first dial having a plurality of substantially equally spaced holes around the periphery thereof for viewing the scales of said second dial, a rotatable shaft, bearing means for said dials disposed eccentrically with respect to each other, and means for rotating said dials, said first dial being adapted to be rotated at a different angular velocity than said second dial for exhibiting different parts of the scales of said second dial through selected ones of said spaced holes, for indicating rotation of said shaft.

5. An indicating device comprising, a pair of scale carrying members, means for rotating said members with respect to each other, one of said members being disposed in front of and substantially completely masking the other, means in the front one of said members for permitting the viewing of selected portions of the scale of the other of said members, said last mentioned scale being so arranged that succeeding portions thereof brought into view during the movement of said members continually indicate the extent of said rotation.

6. An indicating device comprising, a pair of substantially circular scale carrying members, means for rotating one of said members, means for rotating said members with respect to each other, one of said members being disposed in front of and substantially completely masking the other, means in the front one of said members for permitting the viewing of selected portions of the scale of the other of said members, said last mentioned scale being so arranged that portions thereof brought into view during the movement of said members continually indicate the extent of said movement.

7. An indicating device comprising, a pair of substantially circular scale carrying members, manual means for rotating one of said members, means integral with said members for rotating said members with respect to each other member for substantially completely masking said other member, one of said members being disposed in front of the other, means in the front one of said members for permitting the viewing of selected portions of the scale of the other of said members, said last mentioned scale being so arranged that the portion thereof brought into view during the movement of said members continually indicates the extent of said movement.

8. An indicating device comprising, a pair of scale carrying members, a shaft, means for attaching one of said members to said shaft, means for moving said members with respect to each other, said member attached to said shaft being disposed in front of the other, the front one of said members having a plurality of substantially equally spaced holes for permitting the viewing of selected portions of the scale of the other of said members, said last mentioned scale being so arranged that the portion thereof brought into view in the uppermost of said holes during the movement of said members continually indicates the extent of said movement.

9. A combined indicator and control unit comprising, a pair of disc-like dials comprising a first dial and a second dial, said first dial being positioned in front of said second dial, scales for said second dial, said first dial having means for viewing the scales of said second dial, a rotatable shaft, means for fastening said first dial to said shaft, a bearing member for said second dial disposed eccentrically with respect to said shaft, means for rotating said first dial and said shaft, means for rotating said second dial as said first dial is rotated at a different angular velocity for exhibiting different parts of the scales of said second dial through said scale viewing means for indicating the extent of rotation of said shaft, and means for said first mentioned rotatable shaft for driving a variable electric unit for transmitting the effect of angular motion of said first mentioned shaft to said variable electrical unit.

10. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a shaft for said worm wheel and means for attaching a variable electrical device to said worm wheel shaft for varying said variable electrical device in accordance with the rotation of said knob.

11. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, a bearing for said second dial positioned over said shaft, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a shaft for said worm wheel and means for attaching a variable electrical device to said worm wheel shaft for varying said variable electrical device in accordance with the rotation of said knob.

12. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, a bearing eccentrically disposed with respect to said shaft for said second dial, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a shaft for said worm wheel and means for attaching a variable electrical device to said worm wheel shaft for varying said variable electrical device in accordance with the rotation of said knob.

13. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, said last mentioned means comprising a gear formed integral with said first mentioned dial and a gear integral with said second dial, said gears being adapted to mesh, a worm gear for said shaft, a worm wheel meshed with said worm gear, a shaft for said worm wheel and means for attaching a variable electrical device to said worm wheel shaft for varying said variable electrical device in accordance with the rotation of said knob.

14. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a second worm wheel positioned alongside of said first mentioned worm wheel in mesh with said worm gear, resilient means for tensioning said second worm wheel with respect to said first mentioned worm wheel to take up back-lash developed between said first mentioned worm wheel and said worm gear, a shaft for said worm wheel and means for attaching a variable electrical device to said worm wheel shaft for varying said variable electrical device in accordance with the rotation of said knob.

15. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, and means for attaching a variable electrical device to said shaft for varying said variable electrical device in accordance with the rotation of said knob.

16. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, means for taking up back-lash developed between said worm gear and said worm wheel, a shaft for said worm wheel and means for attaching a variable electrical device to said worm wheel shaft for varying said variable electrical device in accordance with the rotation of said knob.

17. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a housing for said worm gear and said worm wheel, means for said housing and said worm wheel for limiting rotation of said worm wheel and said dials, a shaft for said worm wheel and means for attaching a variable electrical device to said worm wheel shaft for varying said variable electrical device in accordance with the rotation of said knob.

18. An indicating device comprising in combination, rotatable scale means, a rotatable mask, means for rotating said scale means and said mask, said mask having aperture means for revealing selected parts of the scale of said scale means during rotation thereof, said mask aperture means and said scale means being so related that different parts of said scale means indicating the extent of rotation thereof are brought into view through said aperture means at a reference point of vision through said aperture means of said mask as said mask and scale are rotated.

WILLIAM GRAYDON SMITH.

DISCLAIMER 2,060,537.—*William Graydon Smith*, Newton Highlands, Mass. INDICATING DEVICE. Patent dated November 10, 1936. Disclaimer filed August 3, 1942, by the assignee, *National Company, Inc.*

Hereby disclaims claims 1, 2, 4 and 18 of said patent.

[*Official Gazette August 25, 1942.*]

ed to be viewed through said holes, means for rotating said second dial as said first dial is rotated at a slightly different angular velocity for bringing different parts of said scales into view in selected ones of said holes for indicating the extent of rotation of said first mentioned dial and shaft, and means for attaching a variable electrical device to said shaft for varying said variable electrical device in accordance with the rotation of said knob.

16. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, means for taking up back-lash developed between said worm gear and said worm wheel, a shaft for said worm wheel and means for attaching a variable electrical device to said worm wheel shaft for varying said variable electrical device in accordance with the rotation of said knob.

17. A combined indicator and control unit for variable condensers and like apparatus comprising; a disc-like dial, a knob for said dial, a shaft, means for attaching said dial to said shaft, said dial having a plurality of graduations around the periphery thereof and a plurality of holes equally spaced adjacent to the periphery thereof, a second disc-like dial positioned back of said first mentioned dial, scales for said second dial adapted to be viewed through said holes, means for rotating said second dial as said first dial is rotated at a slightly different angular velocity for bringing different parts of said scales into view in selected ones of said holes for indicating the extent of rotation of said first mentioned dial and shaft, a worm gear for said shaft, a worm wheel meshed with said worm gear, a housing for said worm gear and said worm wheel, means for said housing and said worm wheel for limiting rotation of said worm wheel and said dials, a shaft for said worm wheel and means for attaching a variable electrical device to said worm wheel shaft for varying said variable electrical device in accordance with the rotation of said knob.

18. An indicating device comprising in combination, rotatable scale means, a rotatable mask, means for rotating said scale means and said mask, said mask having aperture means for revealing selected parts of the scale of said scale means during rotation thereof, said mask aperture means and said scale means being so related that different parts of said scale means indicating the extent of rotation thereof are brought into view through said aperture means at a reference point of vision through said aperture means of said mask as said mask and scale are rotated.

WILLIAM GRAYDON SMITH.

DISCLAIMER 2,060,537.—*William Graydon Smith*, Newton Highlands, Mass. INDICATING DEVICE. Patent dated November 10, 1936. Disclaimer filed August 3, 1942, by the assignee, *National Company, Inc.*

Hereby disclaims claims 1, 2, 4 and 18 of said patent.

[*Official Gazette August 25, 1942.*]

DISCLAIMER 2,060,537.—*William Graydon Smith*, Newton Highlands, Mass. INDICATING DEVICE. Patent dated November 10, 1936. Disclaimer filed August 3, 1942, by the assignee, *National Company, Inc.*

Hereby disclaims claims 1, 2, 4 and 18 of said patent.

[*Official Gazette August 25, 1942.*]